(12) United States Patent
Yamamoto et al.

(10) Patent No.: US 7,799,469 B2
(45) Date of Patent: Sep. 21, 2010

(54) NONAQUEOUS ELECTROLYTE SOLUTION AND SECONDARY BATTERY USING THE ELECTROLYTE SOLUTION

(75) Inventors: Kouhei Yamamoto, Aichi (JP); Satoru Suzuki, Aichi (JP); Manabu Yamada, Aichi (JP); Takayuki Taki, Tokyo (JP); Atsuo Tomita, Tokyo (JP); Hiroto Asano, Tokyo (JP)

(73) Assignees: Denso Corporation, Kariya-Shi (JP); Adeka Corporation, Tokyo (JP)

( * ) Notice: Subject to any disclaimer, the term of this patent is extended or adjusted under 35 U.S.C. 154(b) by 830 days.

(21) Appl. No.: 11/783,961

(22) Filed: Apr. 13, 2007

(65) Prior Publication Data

US 2007/0243470 A1    Oct. 18, 2007

(30) Foreign Application Priority Data

Apr. 17, 2006    (JP) .............................. 2006-113909

(51) Int. Cl.
*H01M 6/16* (2006.01)
(52) U.S. Cl. ...................... 429/326; 429/324; 429/329; 429/330; 429/337; 429/338; 429/340; 429/341; 429/199; 429/200
(58) Field of Classification Search ................. 429/326, 429/324, 329, 330, 337, 338, 340, 341, 199, 429/200; 252/62.2
See application file for complete search history.

(56) References Cited

U.S. PATENT DOCUMENTS

2007/0048621 A1 *    3/2007    Kashida et al. ............. 429/326

* cited by examiner

Primary Examiner—Laura S Weiner
(74) Attorney, Agent, or Firm—Young & Thompson

(57) ABSTRACT

A nonaqueous electrolyte solution in which an electrolyte salt is dissolved in an organic solvent includes, includes at least one or more compounds selected from the silicon compounds represented by general formula (1), (2), or (3) below:

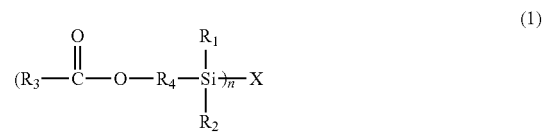

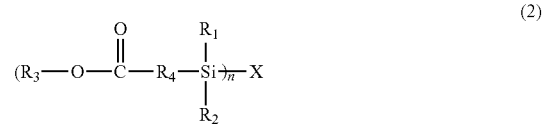

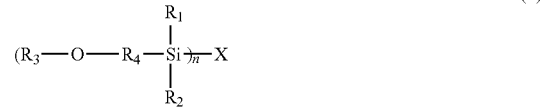

(In the formulae, each of $R_1$, $R_2$, and $R_3$ independently represents a $C_{1-8}$ alkyl, $C_{2-8}$ alkenyl, $C_{2-8}$ alkynyl, or $C_{6-8}$ aryl group; $R_4$ represents a $C_{1-8}$ alkylene, $C_{2-8}$ alkenylene, $C_{2-8}$ alkynylene, or $C_{6-8}$ arylene group; and n represents 1 or 2. When n is 1, X represents a fluorine atom, trifluoromethyl group, $C_{1-8}$ alkoxy group, $C_{2-8}$ alkenyloxy group, $C_{6-8}$ aryloxy group, or $C_{2-8}$ acyloxy group, $C_{1-8}$ sulfonyloxy group, isocyanato group, isothiocyanato group, or cyano group. When n is 2, X represents a $C_{1-8}$ alkylene group, $C_{1-8}$ alkylenedioxy group, $C_{2-8}$ alkenylene group, $C_{2-8}$ alkenylenedioxy group, $C_{2-8}$ alkynylene group, $C_{2-8}$ alkynylenedioxy group, $C_{6-8}$ arylene group, $C_{6-8}$ arylenedioxy group, $C_{2-8}$ diacyloxy group, oxygen atom, or direct bond.)

9 Claims, 1 Drawing Sheet

NONAQUEOUS ELECTROLYTE SOLUTION AND SECONDARY BATTERY USING THE ELECTROLYTE SOLUTION

FIELD OF THE INVENTION

The present invention relates to a nonaqueous electrolyte solution containing a silicon compound having a specific structure and a nonaqueous electrolyte solution secondary battery using said electrolyte solution.

BACKGROUND OF THE INVENTION

With recent circulation of portable electronic devices such as mobile personal computers and handy video cameras, there have been widely used nonaqueous electrolyte solution secondary batteries with high voltage and high energy density as power sources. Further, battery cars and hybrid cars using electric power as part of motive power have been put in practical use from an environmental viewpoint.

Nonaqueous electrolyte solution secondary batteries, however, suffer from decrease of the capacity or increase of internal resistance in storage at high temperatures or in repetitive charge/discharge cycles, and hence they were not sufficiently reliable as stable power sources.

For improving stability and electric properties of nonaqueous electrolyte solution secondary batteries, various additives have been proposed. For example, in secondary batteries using lithium as negative electrodes, Patent Document 1 proposes an electrolyte solution containing 1,3-propanesultone, Patent Document 2 proposes an electrolyte solution containing vinylethylene carbonate, and Patent Document 3 proposes an electrolyte solution containing vinylene carbonate. In secondary batteries using negative electrodes made of carbon material, Patent Document 4 proposes an electrolyte solution containing 1,3-propanesultone and butanesultone. In secondary batteries using negative electrode made of graphite with high crystallinity, Patent Document 5 and Patent Document 6 propose electrolyte solutions containing vinylene carbonate, vinylethylene carbonate, and others.

Electrolyte solutions containing a sultone such as 1,3-propanesultone and butanesultone together with an unsaturated group-containing cyclic carbonate such as vinylene carbonate and vinylethylene carbonate exert a certain level of effects when used for any negative electrode of lithium metal, natural graphite, artificial graphite, easily-graphitizable carbon, non-graphitizable carbon, carbon-coated natural graphite, polyacenes, and the like. This is because such compounds form a stable coating film suppressing reductive decomposition of the electrolyte solution, so-called SEI (solid electrolyte interface) on the surface of the negative electrode. That is, the improving effect results from suppression of side reactions on the surface of the negative electrode such as decomposition of solvents by coating the surface of the negative electrode, thereby mitigating initial irreversible decrease in capacity or other problems. For this reason, vinylene carbonate and the like are widely used as additives for electrolyte solutions in particular. The effect, however, has been insufficient. Namely, since lithium ion is not easily transmitted in a coating film formed from a sultone such as 1,3-propanesultone and butanesultone, an unsaturated group-containing cyclic carbonate such as vinylene carbonate and vinylethylene carbonate, and the like, such a film has only a small effect on reduction of internal resistance. Further, this film is decomposed in long-term use of the battery or at high temperatures because of low durability, and hence the surface of the negative electrode is again exposed after decomposition of the coating film, which has a drawback that the battery is deteriorated in long-term use or at high temperatures. When these compounds are added excessively to electrolyte solutions as an attempt to compensate this drawback, on the contrary, there happens a problem that the resistance increasing rate becomes higher because of the high resistance of coating film formed, deteriorating the performances of batteries. Thus, the long-term performances or high-temperature characteristics of batteries has not been fundamentally improved by adding a sultone such as 1,3-propanesultone and butanesultone and an unsaturated group-containing cyclic carbonate such as vinylene carbonate and vinylethylene carbonate to electrolyte solutions.

Patent Document 7 proposes that the high-temperature stability of electrolyte solutions is improved by adding a silane to electrolyte solutions. Patent Documents 8, 9, and 10 propose batteries in which high capacity can be maintained based on reduced variation of internal resistance and reduced increase of internal resistance by adding a silane to the electrolyte solution. The effect was, however, still unsatisfactory.

[Patent Document 1]: Japanese Patent Laid-Open Publication No. S63-102173

[Patent Document 2]: Japanese Patent Laid-Open Publication No. H04-087156

[Patent Document 3]: Japanese Patent Laid-Open Publication No. H05-074486

[Patent Document 4]: Japanese Patent Laid-Open Publication No. H10-050342

[Patent Document 5]: Japanese Patent Laid-Open Publication No. H08-045545

[Patent Document 6]: Japanese Patent Laid-Open Publication No. 2001-006729

[Patent Document 7]: Japanese Patent Laid-Open Publication No. 2001-307772

[Patent Document 8]: Japanese Patent Laid-Open Publication No. 2002-134169

[Patent Document 9]: Japanese Patent Laid-Open Publication No. 2004-087459

[Patent Document 10]: Japanese Patent Laid-Open Publication No. 2004-039510

SUMMARY OF THE INVENTION

Accordingly, it is an object of the present invention to provide a non-aqueous electrolyte solution that can provide a battery capable of maintaining low internal resistance and high capacity in long-term use or high-temperature storage; and a nonaqueous electrolyte solution secondary battery using said nonaqueous electrolyte solution.

The present inventors have extensively studied and found that the above object can be achieved by incorporating a silicon compound with a specific structure to an electrolyte solution in which an electrolyte salt is dissolved in an organic solvent.

That is, the present invention is based on the above findings and provides an nonaqueous electrolyte solution in which an electrolyte salt is dissolved in an organic solvent and at least one compound selected from the silicon compounds represented by general formulae (1), (2), and (3) is contained and a nonaqueous electrolyte solution secondary battery containing said nonaqueous electrolyte solution as electrolyte solution to achieve the above object.

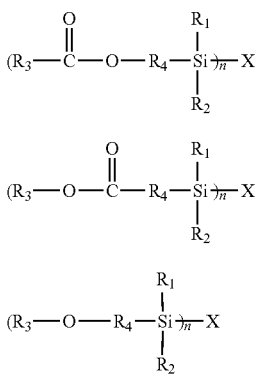

(In the formulae, each of $R_1$, $R_2$, and $R_3$ independently represents a $C_{1-8}$ alkyl, $C_{2-8}$ alkenyl, $C_{2-8}$ alkynyl, or $C_{6-8}$ aryl group; $R_4$ represents a $C_{1-8}$ alkylene, $C_{2-8}$ alkenylene $C_{2-8}$ alkynylene, or $C_{6-8}$ arylene group; and n represents 1 or 2. When n is 1, X represents a fluorine atom, trifluoromethyl group, $C_{1-8}$ alkoxy group, $C_{2-8}$ alkenyloxy group, $C_{6-8}$ aryloxy group, or $C_{2-8}$ acyloxy group, $C_{1-8}$ sulfonyloxy group, isocyanato group, isothiocyanato group, or cyano group. When n is 2, X represents a $C_{1-8}$ alkylene group, $C_{1-8}$ alkylenedioxy group, $C_{2-8}$ alkenylene group, $C_{2-8}$ alkenylenedioxy group, $C_{2-8}$ alkynylene group, $C_{2-8}$ alkynylenedioxy group, $C_{6-8}$ arylene group, $C_{6-8}$ arylenedioxy group, $C_{2-8}$ diacyloxy group, oxygen atom, or direct bond.)

According to the present invention, an ideal state of the electrode surface can be attained by adding the above silicon compound to the electrolyte solution. Namely, in the present invention, the silicon compound can improve the durability and heat resistance of the electrode surface and increase $Li^+$-conductivity of the electrode surface based on the function as a surface-treating agent. The invention thereby provides a battery with excellent durability that has never been attained with conventional electrolyte solutions, namely a battery that can sustainably maintain low internal resistance and high capacity in long-term use or high-temperature storage.

DETAILED DESCRIPTION OF THE INVENTION

Figure 1:
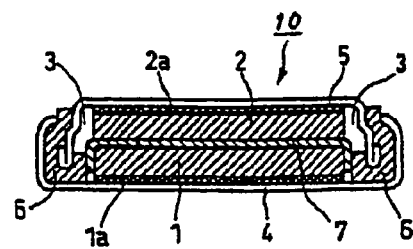
FIG. 1 is a longitudinal cross-sectional view schematically illustrating one example of the configuration of the coin-shaped nonaqueous electrolyte solution secondary battery of the present invention.

Hereafter, detailed description will be given on the nonaqueous electrolyte solution of the present invention and the nonaqueous electrolyte solution secondary battery using said nonaqueous electrolyte solution.

In the nonaqueous electrolyte solution of the present invention, in the silicon compound represented by general formula (1), (2), or (3), the $C_{1-8}$ alkyl group represented by $R_1$, $R_2$, or $R_3$ includes methyl, ethyl, propyl, butyl, sec-butyl, tert-butyl, pentyl, hexyl, heptyl, octyl, 2-ethylhexyl, trifluoromethyl, tetrafluoroethyl, heptafluoropropyl, 2,2,2-trifluoroethyl, and the like; the $C_{2-8}$ alkenyl group includes vinyl, allyl, 1-propenyl, isopropenyl, 2-butenyl, 1,3-butadienyl, 2-pentenyl, 2-octenyl, and the like; the $C_{2-8}$ alkynyl group includes ethynyl, 1-propynyl, 2-propynyl, 1-butynyl, 2-butynyl, 3-butynyl, and the like; and the $C_{6-8}$ aryl group includes phenyl, 2-fluorophenyl, 3-fluorophenyl, 4-fluorophenyl, 2,4-difluorophenyl, 3,5-difluorophenyl, 2,6-difluorophenyl, 2,3-difluorophenyl, 4,5-difluorophenyl, 2,4,6-trifluorophenyl, 2,3,4-trifluorophenyl, tetrafluorophenyl, p-tolyl, m-tolyl, o-tolyl, 2,4-xylyl, 3,5-xylyl, and the like. The $C_{1-8}$ alkylene group represented by $R_4$ includes methylene, ethylene, trimethylene, methylethylene, tetramethylene, pentamethylene, hexamethylene, heptamethylene, octamethylene, difluoromethylene, tetrafluoroethylene, hexafluorotrimethylene, and the like. The $C_{2-8}$ alkenylene group represented by $R_4$ includes vinylene, propenylene, butenylene, pentenylene, and the like. The $C_{2-8}$ alkynylene group represented by $R_4$ includes ethynylene, propynylene, butynylene, pentynylene, and the like. The $C_{6-8}$ arylene group represented by $R_4$ includes phenylene, fluorophenylene, difluorophenylene, and the like.

When n is 1, the $C_{1-8}$ alkoxy group represented by X includes methoxy, ethoxy, propoxy, butoxy, sec-butoxy, tert-butoxy, pentyloxy, hexyloxy, heptyloxy, octyloxy, 2-ethylhexyloxy, 2,2,2-trifluoroethoxy, and the like; the $C_{2-8}$ alkenyloxy group includes vinyloxy, allyloxy, 1-propenyloxy, isopropenyloxy, and the like; the $C_{6-8}$ aryloxy group includes phenoxy, p-fluorophenoxy, m-fluorophenoxy, o-fluorophenoxy, 2,4-difluorophenoxy, 3,5-difluorophenoxy, p-methylphenoxy, m-methylphenoxy, o-methylphenoxy, 2,4-dimethylphenoxy, 3,5-dimethylphenoxy, and the like; the $C_{2-8}$ acyloxy group includes acetoxy, propionyloxy, trifluoroacetoxy, difluoroacetoxy, and the like; and the $C_{1-8}$ sulfonyloxy group includes methanesulfonyloxy, ethanesulfonyloxy, propanesulfonyloxy, butanesulfonyloxy, pentanesulfonyloxy, hexanesulfonyloxy, heptanesulfonyloxy, octanesulfonyloxy, trifluoromethanesulfonyloxy, pentafluoroethanesulfonyloxy, hexafluoropropanesulfonyloxy, perfluorobutanesulfonyloxy, perfluoropentanesulfonyloxy, perfluorohexanesulfonyloxy, perfluoroheptanesulfonyloxy, perfluorooctanesulfonyloxy, and the like.

When n is 2, the $C_{1-8}$ alkylene group represented X includes methylene, ethylene, methylmethylene, trimethylene, methylethylene, tetramethylene, pentamethylene, hexamethylene, heptamethylene, octamethylene, difluoromethylene, tetrafluoroethylene, hexafluorotrimethylene, and the like; the $C_{1-8}$ alkylenedioxy group includes alkylenedioxy groups derived from the above $C_{1-8}$ alkenylene groups, the $C_{2-8}$ alkenylene group includes vinylene, propenylene, butenylene, pentenylene, and the like; the $C_{2-8}$ alkenylenedioxy group includes alkenylenedioxy groups derived from the above $C_{2-8}$ alkenylene groups, the $C_{2-8}$ alkynylene group includes ethynylene, propynylene, butynylene, pentynylene, and the like; the $C_{2-8}$ alkynylenedioxy group includes alkynylenedioxy groups derived from the above $C_{2-8}$ alkynylene groups; the $C_{6-8}$ arylene group includes phenylene, fluorophenylene, difluorophenylene, and the like; the $C_{6-8}$ arylenedioxy group includes arylenedioxy groups derived from the above $C_{6-8}$ arylene groups; and the $C_{2-8}$ diacyloxy group includes oxalyloxy, malonyloxy, succinyloxy, maleinyloxy, fumaryloxy, and the like.

The compounds represented by general formula (1), (2), or (3) include Compounds No. 1 to No. 71 and the like, although not limited thereto.

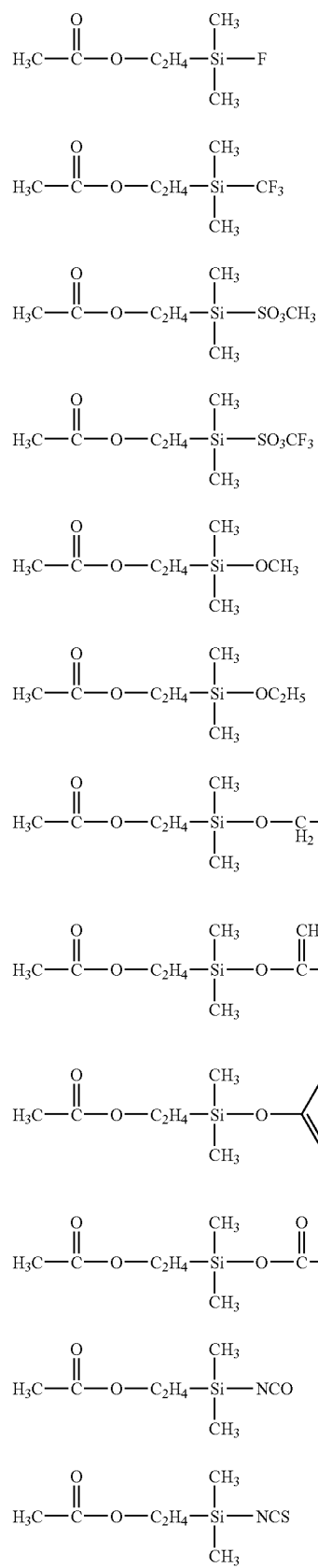

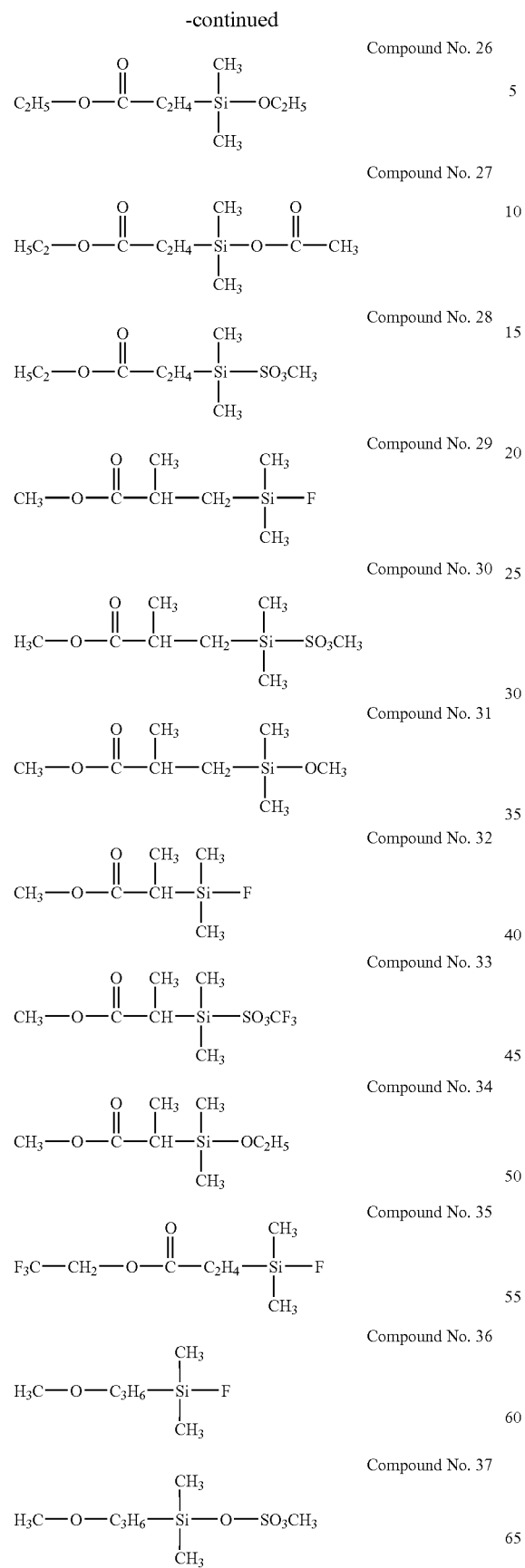
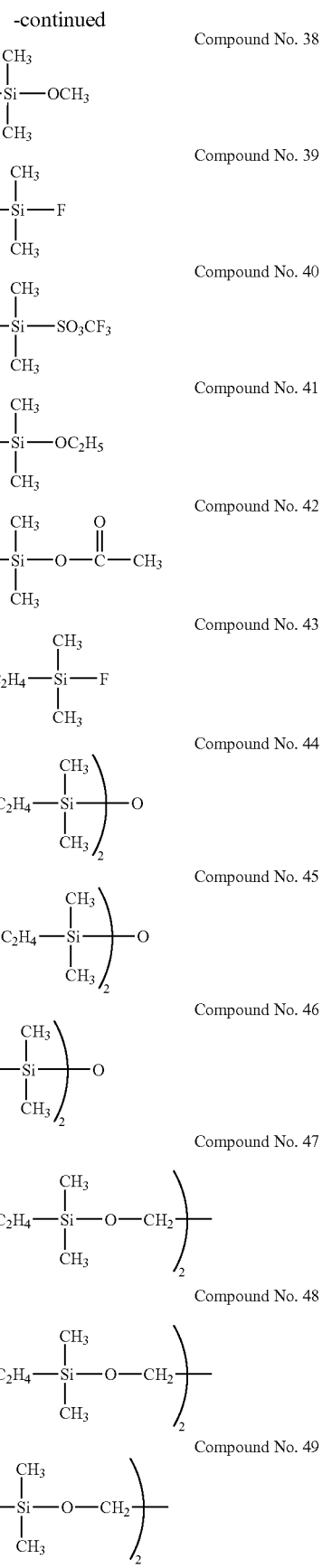

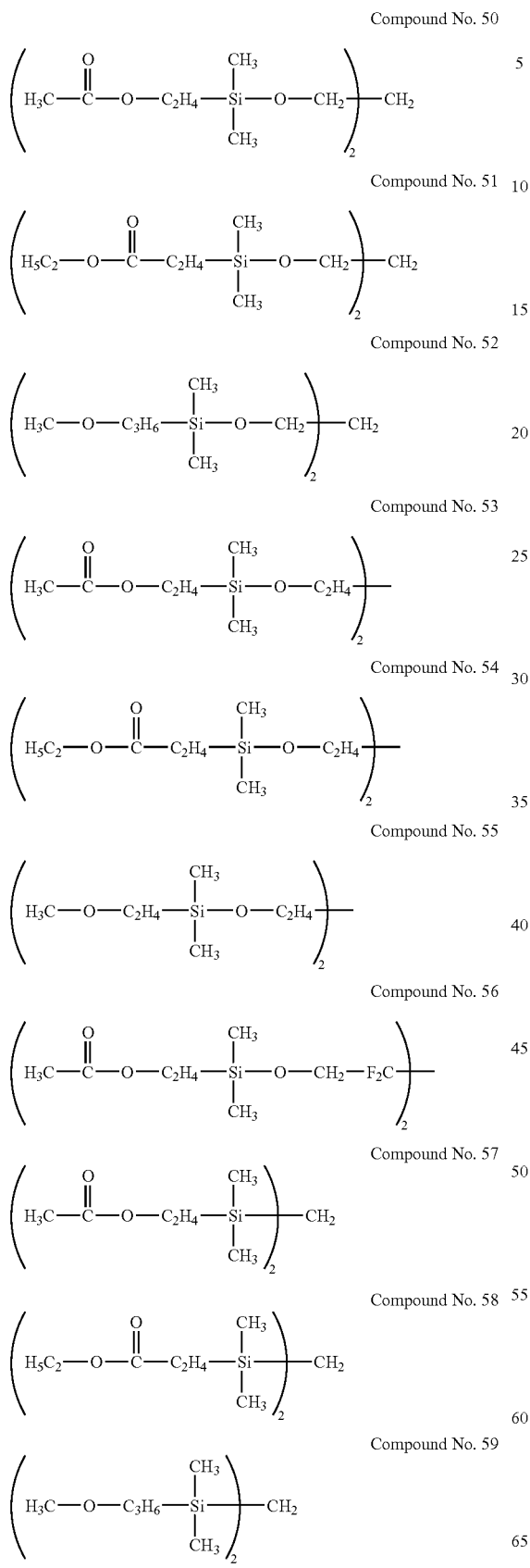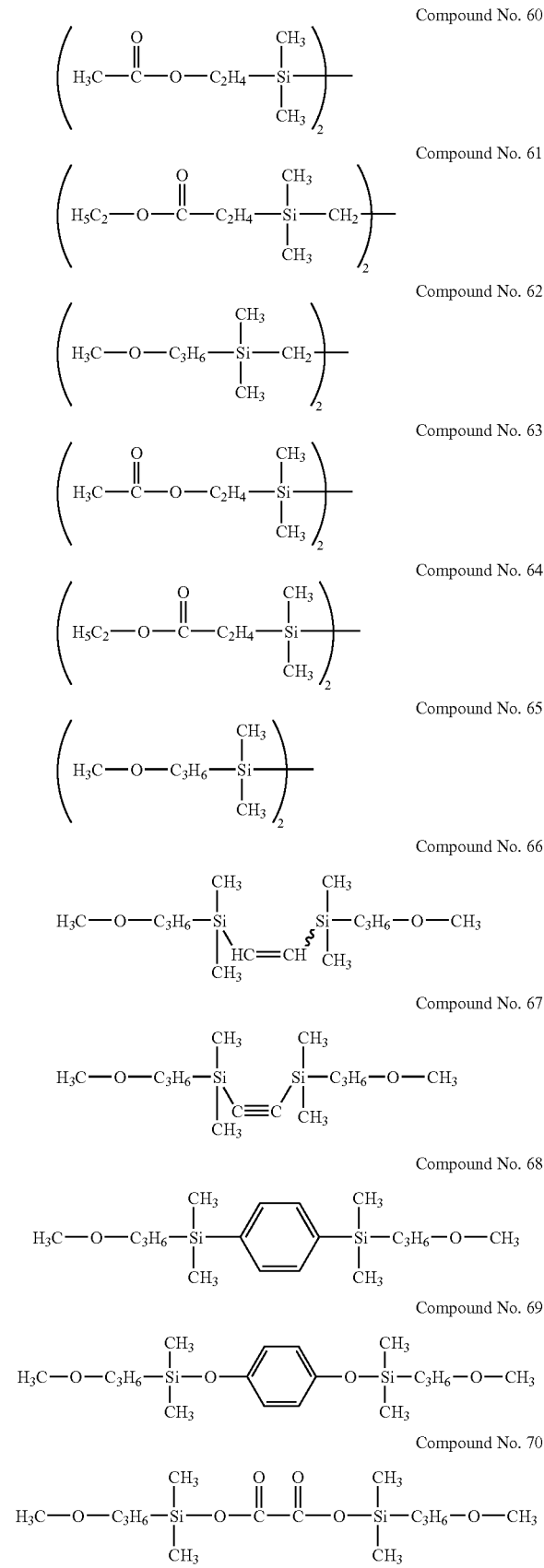

Compound No. 71

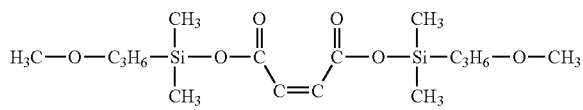

In the present invention, the content of the silicon compound represented by general formula (1), (2), or (3) is preferably 0.05 to 20 mass %, more preferably 0.05 to 10 mass %, and particularly preferably 0.1 to 5 mass % in the nonaqueous electrolyte solution of the present invention. If the content of the silicon compound is less than 0.05 mass %, the effect is hardly observed, while addition in a content exceeding 20 mass % is useless because the effect is not more enhanced, and on the contrary, such excessive use sometimes adversely affects the characteristics of the electrolyte solution, which is undesired.

The silicon compound represented by general formula (1), (2), or (3) can be produced, for example, as follows.

For example, compound No. 1, which is represented by general formula (1), can be obtained by adding dimethylchlorosilane to vinyl acetate via hydrosilylation catalyzed by chloroplatinic acid, followed by fluorination. For the silicon compound represented by general formula (2) or (3), the ester or ether group can be introduced by hydrosilylation with platinum catalyst or rhodium catalyst.

In the present invention, the electrolyte solution may further contain an unsaturated group-containing cyclic carbonate, if necessary. Addition of such a cyclic carbonate is effective for further suppressing decomposition of the solvent on the electrode surface in storage at high temperatures, thereby further improving the capacity retention. This effect is larger than predicted from the effect observed when said cyclic carbonate is used singly, indicating that use of the silicon compound represented by general formula (1), (2), or (3) together with said cyclic carbonate can exert synergic effect for improving the capacity retention.

The unsaturated group-containing cyclic carbonate includes vinylene carbonate, vinylethylene carbonate, methylene-1,3-dioxolan-2-one, ethylidene-1,3-dioxolan-2-one, isopropylidene-1,3-dioxolan-2-one, and the like. It is preferably vinylene carbonate or vinylethylene carbonate.

The content of the unsaturated group-containing cyclic carbonate is preferably 0.05 to 20 mass %, more preferably 0.05 to 10 mass %, and particularly preferably 0.1 to 5 mass % in the nonaqueous electrolyte solution of the present invention. If the content of the cyclic carbonate is less than 0.05 mass %, the effect is hardly observed, while addition in a content exceeding 20 mass % is useless because the effect is not more enhanced, and on the contrary, such excessive use may adversely affect the characteristics of the electrolyte solution, which is undesirable. These unsaturated group-containing cyclic carbonates may be used singly or in combination of two or more.

As the organic solvent used in the nonaqueous electrolyte solution of the present invention, there may be used single or a combination of solvents common to nonaqueous electrolyte solutions. Specifically, the solvent preferably comprises one or more compounds selected from the group consisting of cyclic carbonates, cyclic esters, sulfones, sulfoxides, amides, linear carbonates, linear or cyclic ethers, and linear esters. It is particularly preferred that the solvent comprises one or more cyclic carbonates and one or more linear carbonates.

Use of this combination provides a nonaqueous electrolyte solution with excellent balance between the viscosity of the electrolyte solution and performances of the resulting battery, such as capacity and output, in addition to excellent cycling behavior.

The organic solvents used in the nonaqueous electrolyte solution of the present invention will be more specifically listed below, although the organic solvent used in the present invention is not limited to the following list.

Cyclic carbonates, cyclic esters, sulfones, sulfoxides, and amides have function to increase the dielectric constant of the electrolyte solution because of their high relative permittivities. Specifically, the cyclic carbonates include ethylene carbonate (EC), propylene carbonate (PC), 1,2-butylene carbonate, isobutylene carbonate, and the like. The cyclic esters include γ-butyrolactone, γ-valerolactone, and the like. Sulfones or sulfoxides include sulfolane, sulfolene, tetramethylsulfolane, diphenyl sulfone, dimethyl sulfone, dimethyl sulfoxide, propanesultone, butylenesultone, and the like, among which sulfolanes are preferred. The amides include N-methylpyrrolidone, dimethylformamide, dimethylacetamide, and the like.

The linear carbonates, linear or cyclic ethers, and linear esters contribute to lowering the viscosity of the nonaqueous electrolyte solution. Therefore, these solvents can increase the mobility of electrolyte ions and hence upgrade the battery characteristics such as output density. These solvents also improve performances of the nonaqueous electrolyte solution at low temperatures because of low viscosity. Specifically, the linear carbonates include dimethyl carbonate (DMC), ethyl methyl carbonate (EMC), diethyl carbonate (DEC), ethyl n-butyl carbonate, methyl t-butyl carbonate, diisopropyl carbonate, t-butyl isopropyl carbonate, and the like. The linear or cyclic ethers include dimethoxyethane (DME), ethoxymethoxyethane, diethoxyethane, tetrahydrofuran, dioxolanes, dioxanes, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl)ether, isopropylene glycol(trifluoroethyl)ether, ethylene glycol bis(trifluoromethyl)ether, diethylene glycol bis(trifluoroethyl)ether, and the like, among which dioxolanes are preferred. The linear esters include carboxylic esters represented by general formula (4) below and the like.

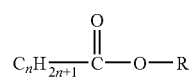

(4)

In general formula (4), R includes $C_{1-4}$ alkyl groups (methyl, ethyl, propyl, isopropyl, butyl, sec-butyl, and tert-butyl). The carboxylic esters represented by general formula (4) include, specifically, methyl formate, ethyl formate, methyl acetate, ethyl acetate, propyl acetate, sec-butyl acetate, butyl acetate, methyl propionate, ethyl propionate, and the like. The carboxylic esters represented by general formula (4) have low freezing point, and therefore it is preferred to further add such an ester to an organic solvent, particularly a mixed organic solvent comprising at least one or more cyclic carbonates and at least one or more linear carbonates, in terms of improving battery characteristics at low temperatures. The content of the carboxylic ester represented by general formula (4) is preferably 1 to 50 vol % in the organic solvent.

Besides the above solvents, there may be used acetonitrile, propionitrile, nitromethane, or derivatives thereof.

The nonaqueous electrolyte solution of the present invention may appropriately contain a halogen-containing, phosphorous-containing, or other flame retardant for attaining flame retardancy. The phosphorous-containing flame retardant includes, phosphate esters such as trimethyl phosphate and triethyl phosphate.

The amount of the flame retardant to be added is preferably 5 to 100 mass %, particularly preferably 10 to 50 mass % relative to the organic solvent composing the nonaqueous electrolyte solution of the present invention. With addition of less than 5 mass % of the flame retardant, sufficient flame retardancy is not imparted.

As the electrolyte salt used in the nonaqueous electrolyte solution of the present invention, there may be used conventional known electrolyte salts, which include, for example, $LiPF_6$, $LiBF_4$, $LiAsF_6$, $LiCF_3SO_3$, $Li[(CF_3SO_2)_2N]$, $Li[(CF_3SO_2)_3C]$, $LiSbF_6$, $LiSiF_5$, $LiAlF_4$, $LiSCN$, $LiClO_4$, $LiCl$, $LiF$, $LiBr$, $LiI$, $LiAlF_4$, $LiAlCl_4$, $NaClO_4$, $NaBF_4$, $NaI$, and derivatives thereof. Among these, preferably used are one or more compounds selected from the group consisting of $LiPF_6$, $LiBF_4$, $LiClO_4$, $LiAsF_6$, $LiCF_3SO_3$, $Li[(CF_3SO_2)_2N]$, $Li[(CF_3SO_2)_3C]$, derivatives of $LiCF_3SO_3$, derivatives of $Li[(CF_3SO_2)_2N]$, and derivatives of $Li[(CF_3SO_2)_3C]$ because of the excellent electric properties.

It is preferred to dissolve the electrolyte salt in the organic solvent in such an amount that its concentration is 0.1 to 3.0 mol/L, particularly 0.5 to 2.0 mol/L, in the nonaqueous electrolyte solution of the present invention. If the concentration of the electrolyte salt is lower than 0.1 mol/L, the current density may be insufficient, while the concentration higher than 3.0 mol/L possibly deteriorates stability of the nonaqueous electrolyte solution.

The nonaqueous electrolyte solution of the present invention can be suitably used as a nonaqueous electrolyte solution composing a primary or secondary battery, particularly nonaqueous electrolyte solution secondary battery described later.

The electrode materials of the battery include materials for positive and negative electrodes. As the positive electrode, there is used an assembly fabricated by coating a collector with an organic solvent-based or aqueous slurry containing a positive electrode active material, a binder, and a conductive material, followed by drying and forming into a sheet. The positive electrode active material includes $TiS_2$, $TiS_3$, $MoS_3$, $FeS_2$, $Li_{(1-x)}MnO_2$, $Li_{(1-x)}Mn_2O_4$, $Li_{(1-x)}CoO_2$, $Li_{(1-x)}NiO_2$, $LiV_3$, $V_2O_5$, and the like. In these positive electrode active materials, x represents a number of 0 to 1. There may be also used the above materials doped or replaced with Li, Mg, Al, or a transition metal such as Co, Ti, Nb, and Cr. These Li-metal composite oxides may be used singly or as a mixture of a plurality thereof. Among these, preferred lithium-metal composite oxide is at least one or more compounds among layered or spinel-type lithium-manganese composite oxides, lithium-nickel composite oxides, and lithium-cobalt composite oxides. The binder for the positive electrode active material includes, but not limited to, for example, polyvinylidene fluoride, polytetrafluoroethylene, EPDM, SBR, NBR, fluororubber, and the like.

As the negative electrode, there is generally used an assembly fabricated by coating a collector with an organic solvent-based or aqueous slurry containing a negative electrode active material and a binder, followed by drying and forming into a sheet. The negative electrode active material includes lithium, lithium alloys, inorganic compounds such as tin compounds, carbonaceous materials, conductive polymers, and the like. Particularly preferred are carbonaceous materials that are highly safe and capable of occluding/releasing lithium ion. Such carbonaceous materials include, but not limited to, graphite, petroleum coke, coal coke, carbonized petroleum pitch, carbonized coal pitch, carbonized materials of phenol resin, crystalline cellulose, or the like, carbon materials obtained by partial carbonization of these materials, furnace black, acetylene black, pitch-based carbon fiber, PAN-based carbon fiber, and the like. The binder for the negative electrode active material includes binders similar to those for the positive electrode active material, although not limited thereto.

The conductive material used in the positive electrode includes graphite fine particles, carbon black such as acetylene black and ketchen black, fine particles of amorphous carbon such as needle coke, carbon nanofiber, and the like, although not limited thereto. As the organic solvent for slurring, generally used is an organic solvent that can dissolve the binder. Non-limiting examples of the organic solvent include N-methylpyrrolidone, dimethylformamide, diemethylacetamide, methyl ethyl ketone, cyclohexanone, methyl acetate, methyl acrylate, diethylenetriamine, N,N-dimethylaminopropylamine, ethylene oxide, tetrahydrofuran, and the like.

As the collector in the negative electrode, there is generally used copper, nickel, stainless steel, nickel-plated steel, or the like. As the collector in the positive electrode, there is generally used aluminum, stainless steel, nickel-plated steel, or the like.

In the nonaqueous electrolyte solution secondary battery of the present invention, a separator is used between the positive electrode and the negative electrode. As the separator, there may be used a common microporous polymer film without particular limitation. Such a film includes, for example, films made of a polymer or its derivative mainly comprising polyethylene, polypropylene, polyvinylidene fluoride, polyvinylidene chloride, polyacrylonitrile, polyacrylamide, polytetrafluoroethylene, polysulfone, polyethersulfone, polycarbonate, polyamide, polyimide, polyethers such as polyethylene oxide and polypropylene oxide, various celluloses such as carboxymethylcellulose and hydroxypropylcellulose, poly(meth)acrylic acid or esters thereof, or the like; a copolymer or mixture of such polymers; or the like. Each of these films may be used singly or a plurality thereof may be laminated to use as a multilayered film. These films may contain various additives, and types and contents thereof are not particularly limited. Among these films, films made of polyethylene, polypropylene, polyvinylidene fluoride, or polysulfone are suitably used in the nonaqueous electrolyte solution secondary battery of the present invention.

These films are provided with micropores to facilitate impregnation of the electrolyte solution and hence transmission of ions. The method for forming micropores includes "phase-separation method", in which a film is formed from a solution containing a polymer and a solvent under such conditions that microscopic phase separation takes place, and then only the solvent is removed by extraction to form micropores in the film; "drawing method", in which a molten polymer is extruded at a high draft ratio to form a film, which is heat-treated to uniaxially orient crystals and then drawn to form micropores as voids between the crystals; and the like. The method is selected according to the film to be used.

In the nonaqueous electrolyte solution secondary battery of the present invention, the electrode materials, nonaqueous electrolyte solution, and separator may contain a phenolic antioxidant, phosphorous-containing antioxidant, thioether-type antioxidant, hindered amine, or the like for further improving safety.

The phenolic antioxidant includes, for example, 1,6-hexamethylenebis[(3-tert-butyl-5-methyl-4-hydroxyphenyl)

propionamide], 4,4'-thiobis(6-tert-butyl-m-cresol), 4,4'-butylidenebis(6-tert-butyl-m-cresol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, tetrakis[3-(3,5-di-tert-butyl-4-hydroxyphenyl)propionylmethyl]methane, thiodiethylene glycol bis[(3,5-di-tert-butyl-4-hydroxyphenyl)propionate], 1,6-hexamethylene bis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5.5]undecane, triethylene glycol bis[(3-tert-butyl-4-hydroxy-5-methylphenyl)propionate], and the like. When the phenolic antioxidant is added to the electrode material, its amount is preferably 0.01 to 10 parts by mass, particularly preferably 0.05 to 5 parts by mass, relative to 100 parts by mass of the electrode material.

The phosphorous-containing antioxidant includes, for example, tris(nonylphenyl)phosphite, tris[2-tert-butyl-4-(3-tert-butyl-4-hydroxy-5-methylphenylthio)-5-methylphenyl] phosphite, tridecyl phosphite, octyl diphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidenediphenol diphosphite, tetra(tridecyl) 4,4'-n-butylidenebis(2-tert-butyl-5-methylphenol)diphosphite, hexa(tridecyl) 1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylenebis(4,6-di-tert-butylphenyl) 2-ethylhexyl phosphite, 2,2'-methylenebis(4,6-di-tert-butylphenyl)octadecyl phosphite, 2,2'-ethylidenebis(4,6-di-tert-butylphenyl)fluorophosphite, tris(2-[(2,4,8,10-tetra-tert-butyldibenzo[d,f][1,3,2]dioxaphosphepin-6-yl)oxy]ethyl)amine, 2-ethyl-2-butylpropane-1,3-diyl 2,4,6-tri-tert-butylphenyl phosphite, and the like.

The thioether-type antioxidant includes, for example, dialkyl thiodipropionates such as dilauryl thiodipropionate, dimyristyl thiodipropionate, and distearyl thiodipropionate and pentaerythritol tetra(β-alkylmercaptopropionate).

The hindered amine includes, for example, 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis(2,2,6,6-tetramethyl-4-piperidyl) di(tridecyl) 1,2,3,4-butanetetracarboxylate, bis(1,2,2,6,6-pentamethyl-4-piperidyl)di(tridecyl) 1,2,3,4-butane tetracarboxylate, bis(1,2,2,4,4-pentamethyl-4-piperidyl) 2-butyl-2-(3,5-di-tert-butyl-4-hydroxybenzyl)malonate, 1-(2-hydroxyethyl-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl]aminoundecane, 1,6,11-tris[2,4-bis(N-butyl-N-(1,2,2,6,6-pentamethyl-4-piperidyl)amino)-s-triazin-6-yl]aminoundecane, and the like.

For the nonaqueous electrolyte solution secondary battery of the present invention, which is constituted as above, its shape is not particularly limited and may be any of various shapes such as coin-shape, cylinder, and box-shape. FIG. 1 illustrates an example of the coin-shaped nonaqueous electrolyte solution secondary battery of the present invention, while FIGS. 2 and 3 illustrate an example of the cylindrical battery.

In the coin-shaped nonaqueous electrolyte solution secondary battery 10 shown in FIG. 1, 1 is a positive electrode that can release lithium ion, 1a is a positive electrode collector, 2 is a negative electrode made of a carbonaceous material that can occlude and release lithium ion, 2a is a negative electrode collector, 3 is the nonaqueous electrolyte solution of the present invention, 4 is a stainless steel-made positive electrode case, 5 is a stainless steel-made negative electrode case, 6 is a polypropylene-made gasket, and 7 is a polyethylene-made separator.

Figure 2:
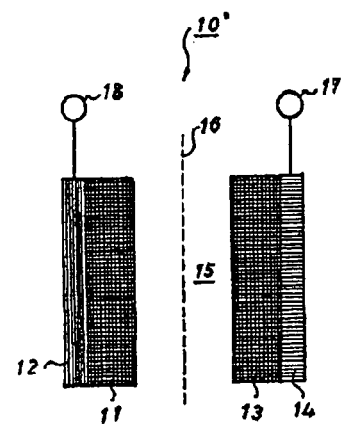
FIG. 2 is a schematic view illustrating fundamental structure of the cylindrical nonaqueous electrolyte solution secondary battery of the present invention.
Figure 3:
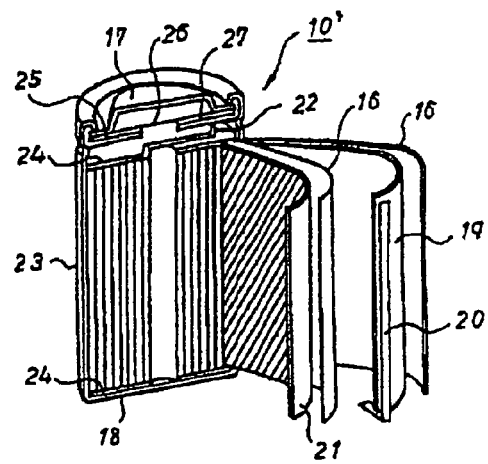
FIG. 3 is an oblique view illustrating a cross-section of the internal structure of the cylindrical nonaqueous electrolyte solution secondary battery of the present invention.

In the cylindrical nonaqueous electrolyte solution secondary battery 10' shown in FIGS. 2 and 3, 11 is a negative electrode, 12 is a negative electrode collector, 13 is a positive electrode, 14 is a positive electrode collector, 15 is the nonaqueous electrolyte solution of the present invention, 16 is a separator, 17 is a positive terminal, 18 is a negative terminal, 19 is a negative electrode plate, 20 is a negative electrode lead, 21 is a positive electrode plate, 22 is a positive electrode lead, 23 is a case, 24 is an insulating plate, 25 is a gasket, 26 is a safety valve, and 27 is a PTC element.

Hereinafter, the present invention will be detailed with Examples. However, the present invention is not at all limited to Examples below.

In Examples and Comparative Examples, nonaqueous electrolyte solution secondary batteries (lithium secondary batteries) were produced in the following procedures.

<Production Procedures>

(Fabrication of Positive Electrode)

In 80 parts by mass of water were dispersed 85 parts by mass of $LiNi_{0.8}Co_{0.17}Al_{0.03}O_2$, 12 parts by mass of acetylene black, and 1 part by mass of carboxymethylcellulose sodium salt (CMC), and further 1 part by mass of polytetrafluoroethylene (PTFE) was added here as a binder and dispersed to prepare a slurry. This slurry was applied to both sides of an aluminum-made positive electrode collector and dried, and the collector was then pressed to form into a positive electrode plate. This positive electrode plate was cut in a predetermined size and the electrode material blend was scratched off from the region where a lead tab for current output would be welded, thereby a sheet-shaped positive electrode was fabricated.

(Fabrication of Negative Electrode)

In 98 parts by mass of water were dispersed 98 parts by mass of graphite powder as a negative electrode active material and 1 part by mass of carboxymethylcellulose sodium salt (CMC), and further 1 part by mass of styrene-butadiene rubber (SBR) was added here as a binder and dispersed to prepare a slurry. This slurry was applied to both sides of a copper-made negative electrode collector and dried, and the collector was then pressed to form into a negative electrode plate. This negative electrode plate was cut in a predetermined size and the electrode material blend was scratched off from the region where a lead tab for current output would be welded, thereby a sheet-shaped negative electrode was fabricated.

(Preparation of Nonaqueous Electrolyte Solution)

Organic solvents were mixed in a ratio shown in Examples and Comparative Examples below, here was dissolved $LiPF_6$ in a concentration of 1 mol/L, and the sample compound(s) (described in Table 1 and Table 2) was/were further added in the amount(s) described in Examples and Comparative Examples to prepare nonaqueous electrolyte solutions.

(Assembly of Battery)

The sheet-shaped positive electrode and sheet-shaped negative electrode fabricated were rolled in such a manner that a 25-μm thick polyethylene-made microporous film was sandwiched therebetween to form a rolled electrode body. This rolled electrode body was inserted into a case to be housed therein. At this time, collector leads, which were welded in one end to lead tab-welding region in the sheet-shaped positive electrode or that in the sheet-shaped negative electrode, were connected to the positive terminal or the negative terminal, respectively, in the case. After that, the nonaqueous electrolyte solution was put into the case housing the rolled electrode body, and the case was tightly closed and sealed to produce a cylindrical lithium secondary battery with a diameter of 18 mm and a longitudinal length of 65 mm.

EXAMPLES 1 TO 15 AND COMPARATIVE EXAMPLES 1 TO 12

In a mixed solvent consisting of 25 vol % of ethylene carbonate, 40 vol % of ethyl methyl carbonate, 30 vol % of dimethyl carbonate, and 5 vol % of diethyl carbonate, $LiPF_6$ was dissolved in a concentration of 1 mol/L, and here were further added 0.5 mass % of sample compound A (described in Table 1), and if needed, 0.5 mass % of sample compound B to prepare each nonaqueous electrolyte solution. Using this nonaqueous electrolyte solution, each lithium secondary battery was produced by the procedures described in above (Assembly of Battery). With the lithium secondary battery, cycling test and 60° C.-storage test were conducted by the following test methods. In the cycling test and the 60° C.-storage test, the discharge capacity retention (%) and the internal resistance ratio were determined. The results are shown in [Table 1]. As Comparative Examples, the tests were conducted by the same methods as those in Examples. Here, sample compounds A used in Comparative Examples were comparative compounds shown below. The results of Comparative Examples are shown in [Table 2].

Comparative Compound No. 1

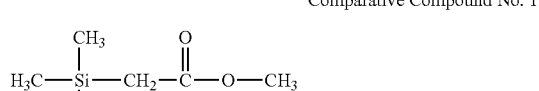

Comparative Compound No. 2

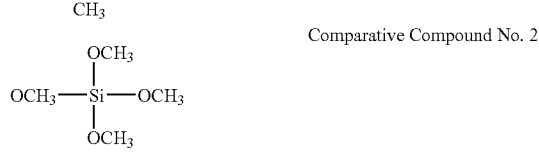

-continued

Comparative Compound No. 3

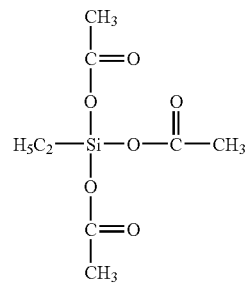

Comparative Compound No. 4

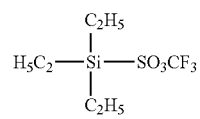

Comparative Compound No. 5

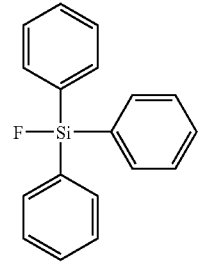

Comparative Compoound No. 6

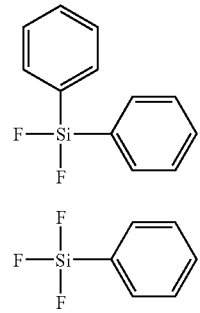

Comparative Compound No. 7

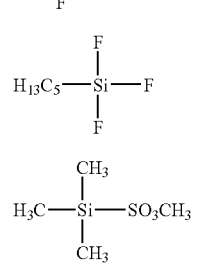

Comparative Compound No. 8

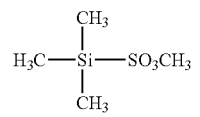

Comparative Compound No. 9

<Method for Cycling Test>

Each lithium secondary battery was placed in a thermostatted chamber at an atmosphere temperature of 60° C. and the charge/discharge cycling was repeated 500 times. In each cycle, the battery was charged up to 4.1 V in a constant-current mode with a charge current of 2.2 mA/cm² (corresponding to 2 C; 1 C is current when the battery capacity is discharged in 1 hour) and then discharged to 3 V in a constant-current mode with a discharge current of 2.2 mA/cm² (corresponding to 2 C). Thereafter, the atmosphere temperature was changed back to 20° C., the battery was charged up to 4.1 V in a constant-current/constant-voltage mode with a charge current of 1.1 mA/cm² (corresponding to 1 C) and then discharged to 3.0 V in a constant-current mode with a discharge current of 0.33 mA/cm² (corresponding to ⅓ C), and the discharge capacity retention (%) was determined from the discharge capacity at this time and the initial discharge capacity using the following equation. The internal resistance at 20° C. was measured before and after 500 cycles of the above test, and the internal resistance ratio was determined from the measured values using the following equation. Here, the initial discharge capacity and internal resistance were determined by the following measurement methods.

Discharge capacity retention (%)=[(Discharge capacity after cycling)/(Initial discharge capacity)]×100

Internal resistance ratio=[(Internal resistance after cycling)/(Internal resistance before cycling in Example 1)]×100

<Method for Measuring Initial Discharge Capacity>

Firstly, the battery was charged up to 4.1 V in a constant-current/constant-voltage mode with a charge current of 0.25 mA/cm² (corresponding to ¼ C) and then discharged to 3.0 V in a constant-current mode with a discharge current of 0.33 mA/cm² (corresponding to ⅓ C). Next, there was repeated four times the procedure that the battery was charged up to 4.1 V in a constant-current/constant-voltage mode with a charge current of 1.1 mA/cm² (corresponding to 1 C) and then discharged to 3.0 V in a constant-current mode with a discharge current of 1.1 mA/cm² (corresponding to 1 C). Thereafter, when the battery was charged up to 4.1 V in a constant-current/constant-voltage mode with a charge current of 1.1 mA/cm² (corresponding to 1 C) and then discharged to 3.0 V in a constant-current mode with a discharge current of 0.33 mA/cm² (corresponding to ⅓ C), the discharge capacity was measured as the initial discharge capacity. Here, the measurement was performed at 20° C.

<Method for Measuring Internal Resistance>

Figure 4:
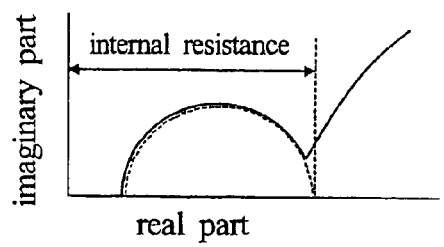
FIG. 4 is the Cole-Cole plot prepared in determining internal resistance of the battery.

First, the battery was charged up to 3.75 V in a constant-current/constant-voltage mode with a charge current of 1.1 mA/cm² (corresponding to 1 C), and the complex impedance was measured in the frequency range scanning from 100 kHz to 0.02 Hz with an alternating-current impedance analyzer (Toyo Corporation; Frequency response analyzer Solartron 1260, Potentio/galvanostat Solartron 1287) to obtain a Cole-Cole plot, where the y-axis represented imaginary part and the x-axis represented the real part. In this Cole-Cole plot, as shown in FIG. 4, the arc region was fit to a circle, and of the two points where the circle crossed with the real part (x-axis), the larger one was obtained as the resistance, which was regarded as the internal resistance of the battery.

<Method for 60° C.-Storage Test>

The fully-charged lithium secondary battery was kept in a thermostatted chamber at an atmosphere temperature of 60° C. After that, the atmosphere temperature was changed back to 20° C., and the discharge capacity and the internal resistance were measured. From the values observed, the discharge capacity retention (%) and the internal resistance ratio were determined using the following equations.

Discharge capacity retention (%)=[(Discharge capacity after 60° C.-storage)/(Initial discharge capacity)]×100

Internal resistance ratio=[(Internal resistance after 60° C.-storage)/(Initial internal resistance in Example 1)]×100

TABLE 1

| | Sample compound A Compound No. | Sample compound B Cyclic carbonate | Cycling test (60° C., 500 cycles) | | 60° C.-Storage test (After 30 days) | |
|---|---|---|---|---|---|---|
| | | | Discharge capacity retention (%) | Internal resistance ratio | Discharge capacity recovery | Internal resistance ratio* |
| Example 1 | No. 1 | None | 94 | 109 | 94 | 105 |
| Example 2 | No. 1 | VC | 96 | 109 | 95 | 104 |
| Example 3 | No. 1 | VEC | 97 | 108 | 96 | 104 |
| Example 4 | No. 5 | None | 94 | 109 | 94 | 105 |
| Example 5 | No. 10 | None | 94 | 109 | 95 | 105 |
| Example 6 | No. 14 | None | 93 | 110 | 93 | 106 |
| Example 7 | No. 19 | None | 93 | 110 | 93 | 106 |
| Example 8 | No. 24 | None | 94 | 108 | 94 | 104 |
| Example 9 | No. 25 | None | 94 | 109 | 93 | 105 |
| Example 10 | No. 25 | VC | 95 | 108 | 95 | 104 |
| Example 11 | No. 36 | None | 93 | 110 | 93 | 109 |
| Example 12 | No. 40 | None | 92 | 112 | 93 | 110 |
| Example 13 | No. 40 | VC | 93 | 110 | 93 | 108 |
| Example 14 | No. 47 | None | 94 | 109 | 94 | 105 |
| Example 15 | No. 47 | VC | 95 | 108 | 95 | 104 |

*Relative value when the initial internal resistance in Example 1 is given 100

TABLE 2

| | Sample compound A Comparative Compound No. | Sample compound B Cyclic carbonate | Cycling test (60° C., 500 cycles) | | 60° C.-Storage test (After 30 days) | |
|---|---|---|---|---|---|---|
| | | | Discharge capacity retention (%) | Internal resistance ratio | Discharge capacity recovery | Internal resistance ratio* |
| Comparative Example 1 | None | None | 77 | 142 | 88 | 127 |

TABLE 2-continued

| Sample | Sample compound A Comparative Compound No. | compound B Cyclic carbonate | Cycling test (60° C., 500 cycles) Discharge capacity retention (%) | Internal resistance ratio | 60° C.-Storage test (After 30 days) Discharge capacity recovery | Internal resistance ratio* |
|---|---|---|---|---|---|---|
| Comparative Example 2 | None | VC | 81 | 138 | 92 | 124 |
| Comparative Example 3 | None | VEC | 84 | 137 | 91 | 123 |
| Comparative Example 4 | Comparative Compound No. 1 | None | 80 | 130 | 88 | 123 |
| Comparative Example 5 | Comparative Compound No. 2 | None | 75 | 150 | 77 | 138 |
| Comparative Example 6 | Comparative Compound No. 3 | None | 72 | 152 | 78 | 143 |
| Comparative Example 7 | Comparative Compound No. 4 | None | 82 | 135 | 89 | 122 |
| Comparative Example 8 | Comparative Compound No. 5 | None | 76 | 153 | 74 | 134 |
| Comparative Example 9 | Comparative Compound No. 6 | None | 69 | 144 | 80 | 131 |
| Comparative Example 10 | Comparative Compound No. 7 | VC | 65 | 157 | 71 | 165 |
| Comparative Example 11 | Comparative Compound No. 8 | None | 63 | 165 | 61 | 172 |
| Comparative Example 12 | Comparative Compound No. 9 | None | 81 | 122 | 91 | 115 |

*Relative value when the initial internal resistance in Example 1 is given 100

The results in Table 1 clearly confirm that the nonaqueous electrolyte solution secondary batteries in Examples, in which the nonaqueous electrolyte solutions of the present invention containing a silicon compound represented by general formula (1), (2), or (3) are used, are excellent in cycling behavior and high-temperature storage characteristics. In contrast, the results in Table 2 clearly indicate that the nonaqueous electrolyte solution secondary batteries in Comparative Examples, in which nonaqueous electrolyte solutions containing no silicon compound of the present invention or nonaqueous electrolyte solutions containing another additive are used, are inferior to the nonaqueous electrolyte solution secondary batteries using the nonaqueous electrolyte solutions of the present invention in cycling behavior and high-temperature storage characteristics.

INDUSTRIAL APPLICABILITY

By using the nonaqueous electrolyte solution of the present invention containing the silicon compound with the specific structure, there can be provided a nonaqueous electrolyte solution secondary battery excellent in cycling behaviors and high-temperature storage characteristics.

What is claimed is:

1. A nonaqueous electrolyte solution in which an electrolytic salt is dissolved in an organic solvent and at least one compound selected from the silicon compounds represented by any of general formulae (1), (2), and (3) below is contained:

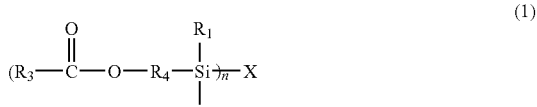

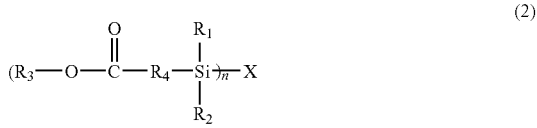

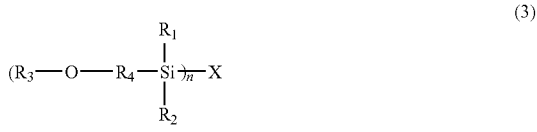

wherein each of $R_1$, $R_2$, and $R_3$ independently represents an alkyl group having 1 to 8 carbon atoms, alkenyl group having 2 to 8 carbon atoms, alkynyl group having 2 to 8 carbon atoms, or aryl group having 6 to 8 carbon atoms; $R_4$ represents an alkylene group having 1 to 8 carbon atoms, alkenylene group having 2 to 8 carbon atoms, alkynylene group having 2 to 8 carbon atoms, or arylene group having 6 to 8 carbon atoms; n represents 1 or 2; when n is 1, X represents a fluorine atom, trifluoromethyl group, alkoxy group having 1 to 8 carbon atoms, alkenyloxy group having 2 to 8 carbon atoms, aryloxy group having 6 to 8 carbon atoms, acyloxy group having 2 to 8 carbon atoms, sulfonyloxy group having 1 to 8 carbon atoms, isocyanato group, isothiocyanato group, or cyano group; and when n is 2, X represents an alkylene group having 1 to 8 carbon atoms, alkylenedioxy group having 1 to 8 carbon atoms, alkenylene group having 2 to 8 carbon atoms, alkenylenedioxy group having 2 to 8 carbon atoms, alkynylene group having 2 to 8 carbon atoms, alkynylenedioxy group having 2 to 8 carbon atoms, arylene group having 6 to 8 carbon atoms, arylenedioxy group having 6 to 8 carbon atoms, diacyloxy group having 2 to 8 carbon atoms, oxygen atom, or direct bond.

2. The nonaqueous electrolyte solution according to claim 1, wherein the content of the silicon compound represented by any of general formula (1), (2), and (3) is 0.05 to 20 mass % in the nonaqueous electrolyte solution.

3. The nonaqueous electrolyte solution according to claim 2, further comprising a cyclic carbonate having an unsaturated group.

4. A nonaqueous electrolyte solution secondary battery containing the nonaqueous electrolyte solution according to claim 2 as the nonaqueous electrolyte solution.

5. The nonaqueous electrolyte solution according to claim 1, further comprising a cyclic carbonate having an unsaturated group.

6. The nonaqueous electrolyte solution according to claim 5, wherein the content of the cyclic carbonate having an unsaturated group is 0.05 to 20 mass % in the nonaqueous electrolyte solution.

7. A nonaqueous electrolyte solution secondary battery containing the nonaqueous electrolyte solution according to claim 6 as the nonaqueous electrolyte solution.

8. A nonaqueous electrolyte solution secondary battery containing the nonaqueous electrolyte solution according to claim 5 as the nonaqueous electrolyte solution.

9. A nonaqueous electrolyte solution secondary battery containing the nonaqueous electrolyte solution according to claim 1 as the nonaqueous electrolyte solution.

* * * * *